(12) United States Patent
Kawashima et al.

(10) Patent No.: US 6,578,996 B1
(45) Date of Patent: Jun. 17, 2003

(54) METHOD OF DESIGNING REFLECTIVE SURFACE OF REFLECTOR IN VEHICLE LAMP

(75) Inventors: Hiroshi Kawashima, Shimizu (JP); Masashi Tatsukawa, Shimizu (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/014,504

(22) Filed: Dec. 14, 2001

(30) Foreign Application Priority Data

Dec. 18, 2000 (JP) ......................... 2000-383984

(51) Int. Cl.[7] ............................................... F21V 7/09
(52) U.S. Cl. ........................................ 362/517; 362/516
(58) Field of Search ................................ 362/516, 518, 362/347, 350, 509, 296, 297, 346, 343

(56) References Cited

U.S. PATENT DOCUMENTS

| | | |
|---|---|---|
| 3,492,474 A | 1/1970 | Yamaguchi et al. |
| 4,905,133 A | 2/1990 | Mayer et al. |
| 4,959,757 A | 9/1990 | Nakata |
| 6,024,473 A | * 2/2000 | Fadel ........................ 362/297 |

FOREIGN PATENT DOCUMENTS

| | | |
|---|---|---|
| JP | 45-7397 | 3/1970 |
| JP | 6-267302 | 9/1994 |

* cited by examiner

*Primary Examiner*—Sandra O'Shea
*Assistant Examiner*—Hargobind S. Sawhney
(74) *Attorney, Agent, or Firm*—Sughrue Mion, PLLC (57) ABSTRACT

A method of designing a reflective surface of a reflector used in a vehicle lamp includes a first base curve generating step of generating a first base curve Q; a second base curve generating step of generating a plurality of second base curves R; and a surface shape generating step of generating a surface shape of the reflective surface RS, based on the first base curve and the plurality of second base curves, wherein the first base curve generating step includes repeating a step of generating one partial curve $Q_i$ and thereafter generating a subsequent partial curve $Q_{i+1}$ so as to be connected to the partial curve, thereby generating one first base curve Q consisting of a plurality of partial curves $Q_i$ connected to each other, and wherein each partial curve $Q_i$ is generated based on a shape parameter according thereto. This substantiates a method of designing a reflective surface of a reflector in a vehicle lamp with improved controllability of a light distribution pattern and with improved efficiency of a designing work.

3 Claims, 9 Drawing Sheets

| 41 | NUMBER OF DIVISIONS | 9 |
|---|---|---|
| | LIGHT SOURCE POSITION (IN X-DIRECTION) | 0.00 |
| | UPPER EDGE OF REFLECTIVE SURFACE (IN Z-DIRECTION) | 50.00 |
| | LOWER EDGE OF REFLECTIVE SURFACE (IN Z-DIRECTION) | 0.00 |
| | FOCAL LENGTH | 25.00 |

XY CURVE PARAMETERS (42)

| BASE POINT NUMBER | Y-COORDINATE | REFLECTION ANGLE |
|---|---|---|
| 0 (START POINT) | 0.00 | 0.00 |
| 1 | 10.00 | 5.00 |
| 2 | 19.00 | 10.00 |
| 3 | 27.00 | 15.00 |
| 4 | 34.00 | 20.00 |
| 5 | 40.00 | 25.00 |
| 6 | 45.00 | 30.00 |
| 7 | 49.00 | 35.00 |
| 8 | 53.00 | 40.00 |
| 9 | 55.00 | 45.00 |

(42a, 42b, 42c)

XZ CURVE PARAMETERS (43)

| BASE POINT NUMBER | REFLECTION ANGLE (AT UPPER END) | REFLECTION ANGLE (AT LOWER END) | VERTICAL ADJUSTMENT FACTOR | LONGITUDINAL ADJUSTMENT FACTOR |
|---|---|---|---|---|
| 0 | 0.00 | 0.50 | 0.00 | 0.900 |
| 1 | 0.00 | 1.00 | 0.10 | 0.910 |
| 2 | 0.00 | 1.50 | 0.20 | 0.920 |
| 3 | 0.00 | 2.00 | 0.30 | 0.930 |
| 4 | 0.00 | 2.50 | 0.40 | 0.940 |
| 5 | 1.00 | 3.00 | 0.50 | 0.950 |
| 6 | 1.00 | 3.50 | 0.60 | 0.960 |
| 7 | 1.00 | 4.00 | 0.70 | 0.970 |
| 8 | 1.00 | 4.50 | 0.80 | 0.980 |
| 9 | 1.00 | 5.00 | 0.90 | 0.990 |

(43a, 43b, 43c, 43d, 43e)

40

METHOD OF DESIGNING REFLECTIVE SURFACE OF REFLECTOR IN VEHICLE LAMP

BACKGROUND OF THE INVENTION

1. Field of the Invention

The present invention relates to a method of designing a reflective surface of a reflector in a vehicle lamp used in vehicles such as automobiles and the like.

2. Related Background Art

A vehicle lamp is comprised of a light source (light source bulb) located at a predetermined light source position, a reflector for reflecting light from the light source bulb to the direction of the optical axis, and a lens for transmitting reflected light from the reflector and projecting the light to the outside of the lamp.

In the vehicle lamp of this structure, a light distribution pattern of the light emerging from the lamp is mainly determined by the shape and positional relation of the reflective surface of the reflector to the light from the light source bulb. Namely, the light from the light source bulb, impinging upon the reflective surface of the reflector, is reflected at respective regions of the reflective surface in accordance with reflection conditions such as reflection directions and optical diffusion conditions determined by surface shapes in the respective regions, and is projected as the reflected light out of the lamp. Part of the reflection conditions such as the optical diffusion conditions and others of the reflected light are also determined by the lens transmitting the reflected light.

The known reflective surfaces of reflectors used in the vehicle lamps, such as headlamps, include those described in Japanese Patent Publication No. S45-7397 and Japanese Patent Application Laid-Open No. H06-267302. For example, in the headlamp described in Publication No. S45-7397, the surface shape of the reflective surface is generated in such a way that a cross-sectional profile along the major axis direction of the reflective surface is defined as a hyperbola and the reflective surface is determined by an enveloping surface enveloping paraboloids of revolution that have the same focus as the hyperbola and that are tangent to the hyperbola.

In the headlamp described in Application LaidOpen No. H06-267302, the basic surface shape of the reflective surface is defined by a paraboloid of revolution and the center axis of revolution is set perpendicular to the optical axis. Then the surface shape of the reflective surface is generated by rotating each region of the paraboloid of revolution at an angle of revolution, which increases with distance from the optical axis, about the center axis of revolution.

SUMMARY OF THE INVENTION

Concerning the light emerging from the vehicle lamps as described above, the resultant light distribution pattern is required to satisfy certain conditions as to the range of emergence of the reflected light from the reflector, optical intensity in each reflection direction, etc., according to types, uses, and locations in the vehicle of the respective lamps. For this requirement, it is generally difficult to implement a light distribution pattern required of each lamp, by the foregoing configurations wherein the surface shape of the reflective surface is the simple combination of the quadratic curves, such as parabolas and hyperbolas, and the paraboloids of revolution.

Namely, the vehicle lamps need to meet (1) the conditions from the aspect concerning the function, such as the aforementioned light distribution pattern or the like, and, in addition thereto, (2) the conditions from the aspect concerning the shape (shape constraints) and (3) the conditions from the aspect concerning the appearance (appearance constraints) because of their use in a mounted state on the vehicles such as automobiles and the like. Particularly, a variety of conditions are recently being imposed on the tendency toward fascinating car styling, and so on.

In the reflectors of the lamps applied to the vehicles, it is thus necessary to implement the shape of the reflective surface capable of yielding the required light distribution pattern while satisfying the constraints from the shape aspect and the appearance aspect imposed about the area, the depth, and so on. Under such circumstances, the reflective surfaces of the surface shapes employing the paraboloids of revolution, hyperbolas, etc. allowed only low degrees of freedom in designing of the reflective surfaces and it was difficult to produce a reflective surface so as to satisfy all the various conditions for the function, shape, and appearance as described above.

Even in the case of a reflective surface of a surface shape resulting from some modification (rotation, fine adjustment of each region, etc.) of such surface shape, controllability of the light distribution pattern with the modification is not satisfactory, because a correspondence is not always definite between the modification of the reflective surface shape and change of the light distribution pattern. For this reason, the efficiency of a designing work is lowered in designing of the reflective surface for implementing the required distribution pattern, so as to pose a problem of necessity for a long time for the designing of the reflective surface.

It is an object of the present invention, which has been accomplished in order to solve the above problems, to provide a method of designing a reflective surface of a reflector in a vehicle lamp with improved controllability of the light distribution pattern and with improved efficiency of the designing work.

In order to accomplish the above object, a reflective surface designing method according to the present invention is a method of designing a reflective surface of a reflector used in a vehicle lamp, which comprises a first base curve generating step of generating a first base curve on a first base plane including an optical axis passing a light source position where a light source is placed and becoming a direction into which light from the light source is reflected by the reflector, and a first base axis perpendicular to the optical axis; a second base curve generating step of generating a plurality of second base curves extending in a direction of a second base axis perpendicular to the first base plane, for the first base curve; and a surface shape generating step of generating a surface shape of the reflective surface, based on the first base curve and the plurality of second base curves, wherein the first base curve generating step comprises repeating a step of generating one partial curve and thereafter generating a subsequent partial curve so as to be connected to said partial curve, thereby generating one first base curve consisting of a plurality of partial curves connected to each other, and wherein each partial curve is generated based on a shape parameter according thereto.

According to the above-stated method of designing the reflective surface of the reflector in the vehicle lamp, the shape of the reflective surface is generated by generating as a frame of the shape of the reflective surface the single first base curve (XY curve) on the first base plane (XY plane, e.g., a horizontal plane) including the optical axis (X-axis) and the first base axis (Y-axis) and the plurality of second base curves (XZ curves) extending nearly in the direction of the second base axis (Z-axis) from the points on the first base curve, and then spreading a curved surface based on them. The efficiency of the designing work is improved by applying the first base curve and the plurality of second base curves forming the frame, to the designing of the reflective surface.

Since one first base curve is formed by generating each partial curve, based on a shape parameter according to an area thereof and sequentially connecting such partial curves to each other, the controllability of the light distribution pattern is improved, as compared with a method using one shape parameter for the entire first base curve. Further, since the partial curves are sequentially generated from one side, the shape and light distribution pattern become smooth.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the method of designing the reflective surface of the reflector in the vehicle lamp according to the present invention will be described below in detail with reference to the accompanying drawings. Throughout the description of the drawings the same elements will be denoted by the same reference symbols and redundant description will be omitted. It is also noted that dimensional ratios in the drawings do not always coincide with those in the description.

Figure 1:
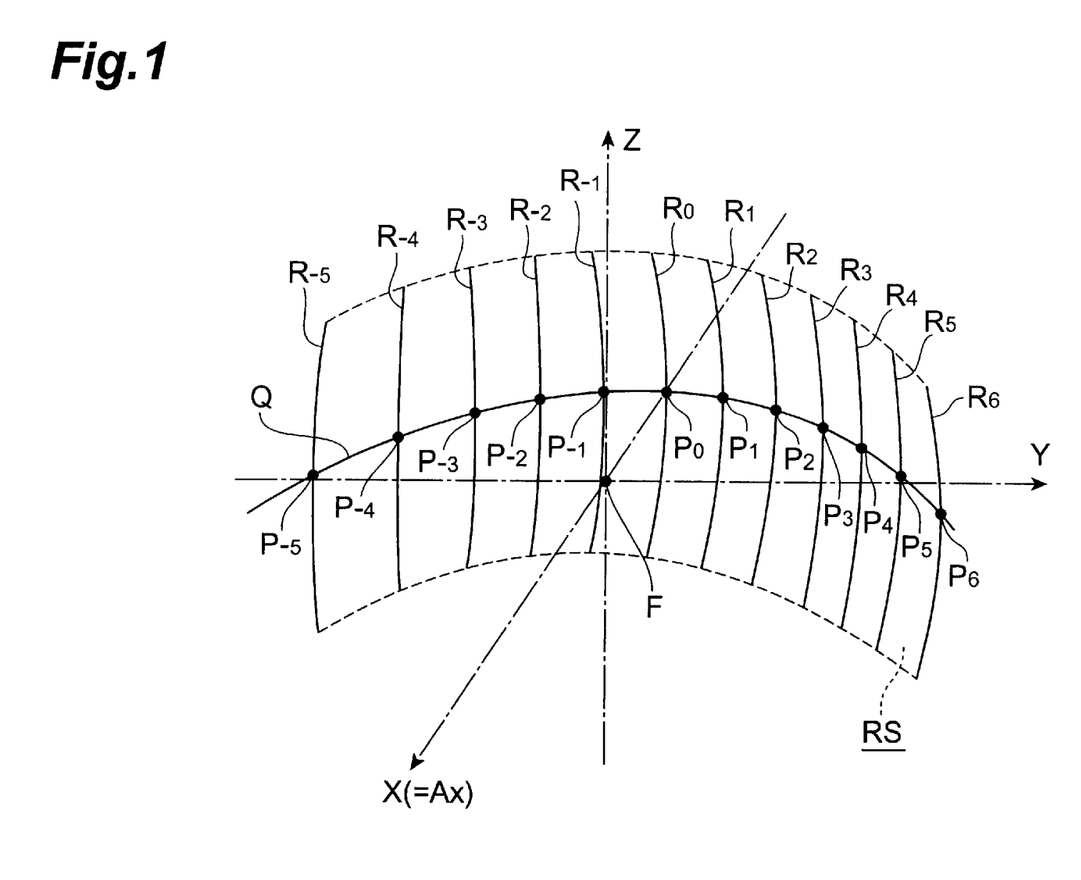
FIG. 1 is a schematic diagram schematically showing a method of designing a reflective surface of a reflector in a vehicle lamp.

First, the method of designing the reflective surface of the reflector in the vehicle lamp according to the present invention will be briefly described. FIG. 1 is a schematic diagram schematically showing the designing method of the reflective surface of the reflector in the vehicle lamp according to the present invention. In FIG. 1, symbol RS represents the reflective surface as a designed object, symbol F a light source position where a light source (light source bulb) for supplying light is placed, and symbol Ax an optical axis passing the light source position F and becoming a direction into which the light from the light source bulb is reflected by the reflector. These light source position F and optical axis Ax are preliminarily given as fundamental conditions for the designing of the reflective surface.

The reflective surface RS designed by the reflective surface designing method described hereinafter is used as a reflective surface of a reflector for reflecting the light from the light source bulb and projecting the light through a lens out of the lamp, in the vehicle lamp such as the headlamp consisting of the light source bulb, the reflector, and the lens.

In the following, the X-, Y-, and Z-coordinate axes are defined as shown in FIG. 1; the X-axis is taken along the longitudinal direction of the lamp, which is the direction of the optical axis Ax. The Y-axis is defined as an axis being perpendicular to the X-axis and becoming the first base axis (e.g., a horizontal direction of the lamp), and the Z-axis as an axis being perpendicular to the X-axis and the Y-axis and becoming the second base axis (e.g., a vertical direction of the lamp).

In the reflective surface designing method according to the present invention, the surface shape of the reflective surface RS is generated by using as a frame an XY curve (first base curve) Q on the XY plane being the first base plane including the X-axis (the optical axis Ax) and the Y-axis and a plurality of XZ curves (second base curves) R extending nearly in the Z-axis direction from respective points on the XY curve Q, and spreading a curved surface based on these.

The XY curve Q being a single first base curve is formed by connecting partial curves generated based on positions of respective base points P set on the XY plane. FIG. 1 shows the XY curve Q generated by smoothly connecting twelve base points $P_{-5}$ to $P_6$ including the base point $P_0$ on the X-axis, by a plurality of partial curves, as an example.

The XZ curves R being a plurality of second base curves consist of curves extending nearly in the Z-axis direction from the respective base points P on the XY curve Q. FIG. 1 shows twelve XZ curves $R_{-5}$ to $R_6$ extending in the Z-axis direction from the respective base points $P_{-5}$ to $P_6$, as an example.

Described below is the reflective surface designing method for carrying out the designing of the reflective surface RS including the generation of these base points P, XY curve Q, and XZ curves R.

Figure 2:
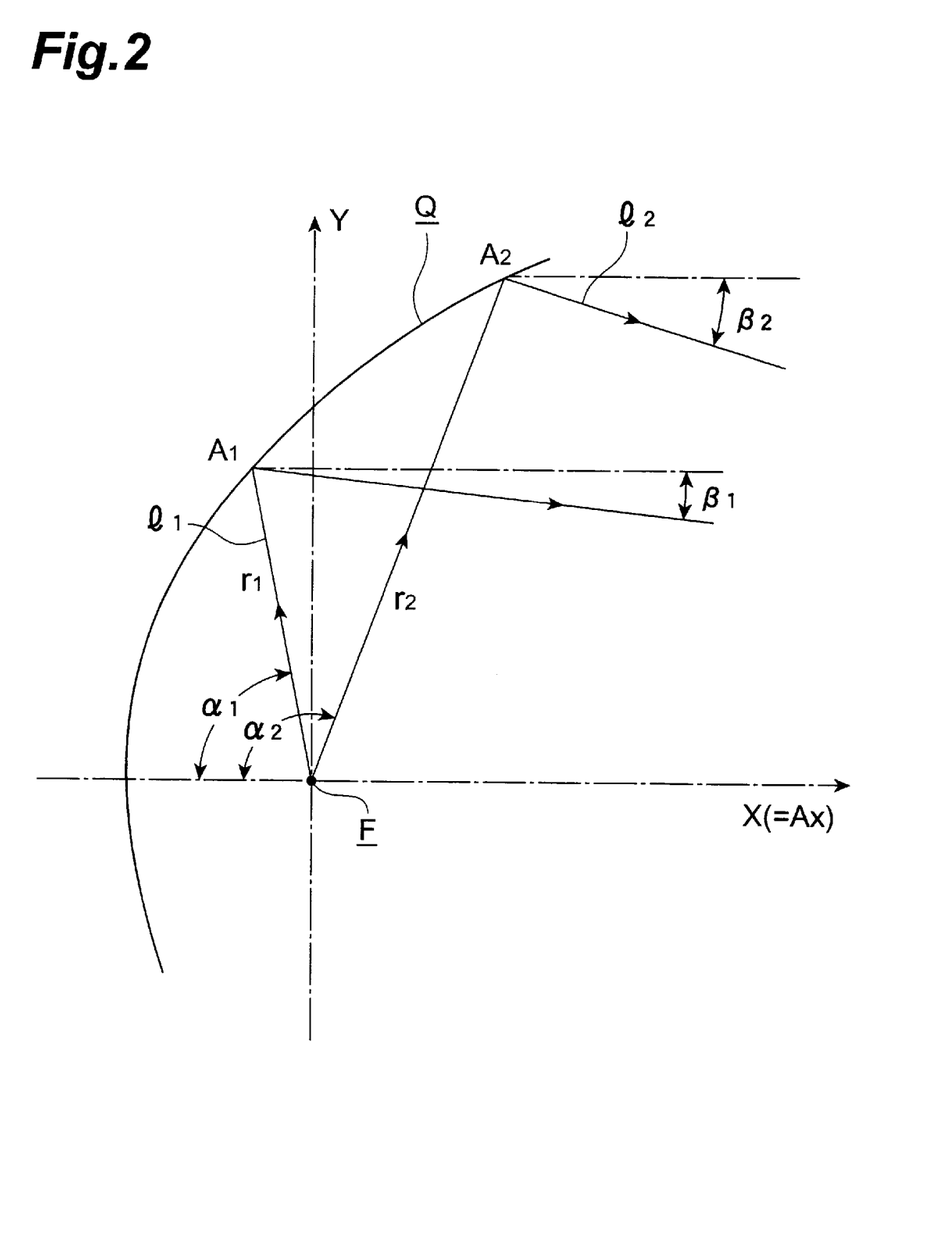
FIG. 2 is a diagram showing angles of incidence of incident light and angles of reflection of reflected light to and from the reflective surface.

First defined herein with reference to FIG. 2 are angles $\alpha$ of incidence of the light (incident light) supplied from the light source bulb located at the light source position F, to the reflective surface RS, and angles $\beta$ of reflection of the reflected light on the reflective surface RS with respect to the optical axis Ax.

The incidence angles $\alpha$ and reflection angles $\beta$ are defined with respect to the X-axis of the optical axis Ax on the XY plane, as shown in FIG. 2. The incidence angles $\alpha$ are defined as angles between the X-axis and optical paths of the incident light from the light source position F to respective points A on the XY curve Q (the reflective surface RS), while the negative direction of the X-axis is defined as 0°. The reflection angles β are defined as angles between the X-axis and optical paths of the reflected light from the respective points A on the XY curve Q, while the positive direction of the X-axis is defined as 0°. FIG. 2 shows two optical paths $1_1$, $1_2$ whose incidence angles are $\alpha_1$, $\alpha_2$ and whose reflection angles are $\beta_1$, $\beta_2$, respectively, at points $A_1$, $A_2$ on the XY curve Q, as an example.

Figure 3:
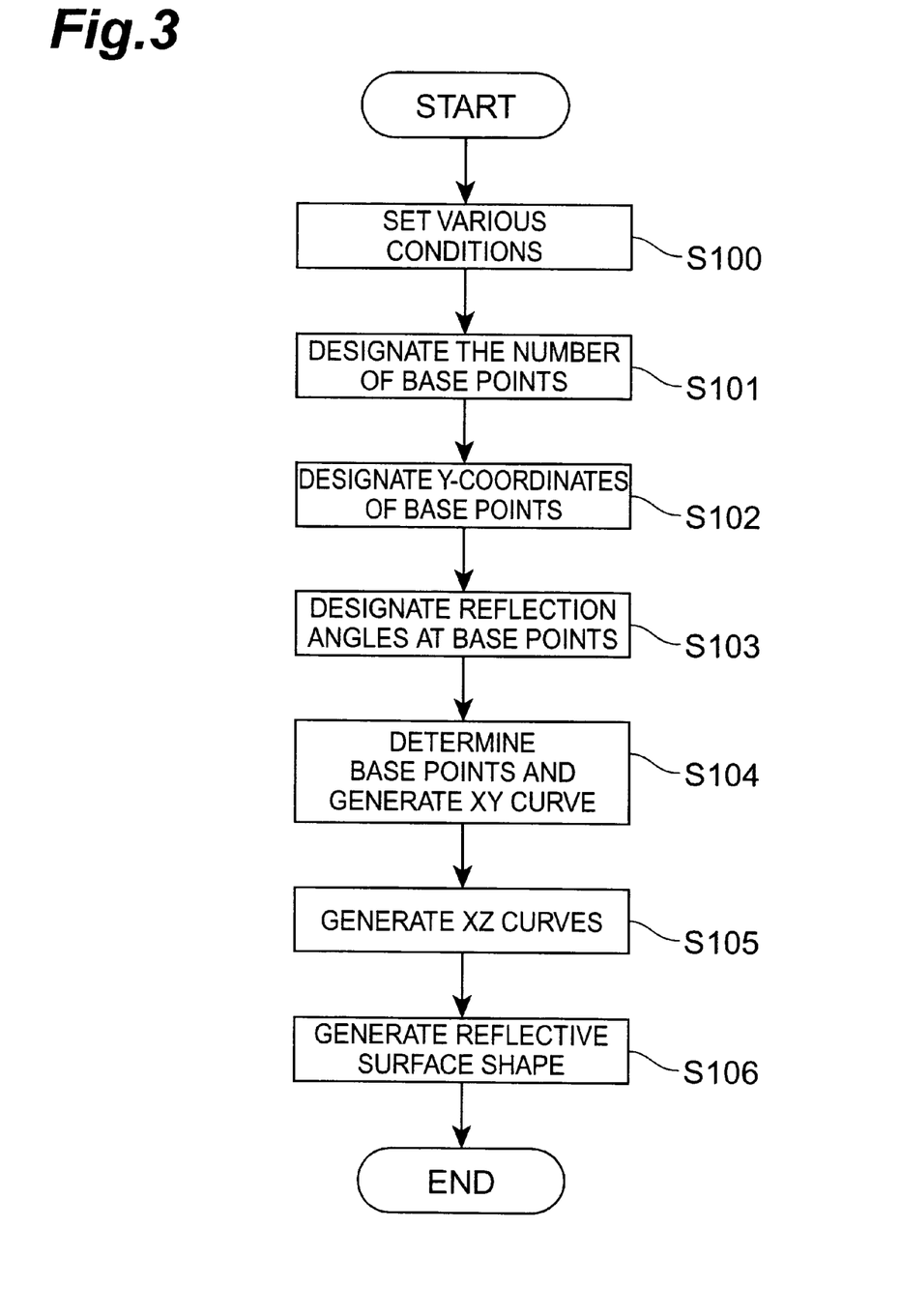
FIG. 3 is a flowchart showing an embodiment of the method of designing the reflective surface of the reflector in the vehicle lamp.

FIG. 3 is a flowchart showing an embodiment of the method of designing the reflective surface of the reflector in the vehicle lamp according to the present invention. The following will describe an example of generation of a reflective surface shape of a surface portion within the first quadrant (the right upper part in FIG. 1) on the YZ plane of $Y \geq 0$ and $Z \geq 0$, out of the entire reflective surface RS. It is, however, noted that, for the surface portions in the other quadrants, their surface shape can also be generated by a similar method. The surface shape obtained for the first quadrant may be applied to each of those surface portions as it is, or it is also possible to generate different surface shapes for the respective quadrants and combine them to form the entire reflective surface shape.

In the reflective surface designing method shown in FIG. 3, various conditions (parameters) fundamental to the designing of the reflective surface RS are first set (S100). These fundamental parameters include an X-coordinate of the light source position F, a focal length $f_0$ at a start point, and so on. In addition, Z-coordinates of the upper edge and the lower edge of the reflective surface RS are also set as occasion may demand. However, the X-coordinate of the light source position F is normally set at 0 and the light source position F is thus defined at the origin of a coordinate system used in the generation of the reflective surface shape.

Subsequently, the number of base points is designated as the number of the plurality of base points P used in the generation of the XY curve Q, the plurality of XZ curves R, and the surface shape of the reflective surface RS (S101). The number of base points may be designated by the number of base points itself, or it can also be designated by the number of divisions of the XY curve Q. When the number of base points is designated by the number of divisions of the XY curve Q, the number of base points=the number of divisions +1. Let us assume herein that the number of divisions of the XY curve Q is designated as n. This number of divisions becomes equal to the number of XY partial curves $Q_i$ described hereinafter (cf. FIG. 5) After the number of base points is designated, shape parameters are designated for the respective XY partial curves $Q_i$ at S102 and S103. In the present embodiment, the shape parameters employed are positions in the Y-axis direction of the respective base points $P_i$ being end points of the XY partial curves $Q_i$, and reflection directions at the respective base points $P_i$. A position in the Y-axis direction is first designated for each of the plurality of (n+1) base points $P_0$ to $P_n$ set on the XY plane (S102). These positions in the Y-axis direction are preferably designated, for example, by Y-coordinates of the respective base points.

Alternatively, they may also be designated by the incidence angles α of the light from the light source position F at the respective base points. Let us assume here that the positions in the Y-axis direction are designated by Y-coordinates $y_0$ to $y_n$ of the respective base points $P_0$ to $P_n$. It is, however, noted that the y-coordinate of the base point $P_0$ being the start point out of all the points is defined as $y_0=0$. The Y-coordinates of the other base points $P_1$ to $P_n$ are designated in order from the side of the optical axis Ax so as to satisfy the condition of $Y_{i-1} < y_i$ (i=1 to n).

The next step is to designate a reflection direction as a direction of reflection of the incident light from the light source position F at each base point $P_i$ (i=0 to n), for the base points $P_0$ to $P_n$ (S103). This reflection direction is preferably designated, for example, by the reflection angle β of the reflected light with respect to the optical axis Ax at each base point. Alternatively, it may also be designated by a position in a light distribution pattern on a plane placed at a predetermined distance from the lamp. Let us assume herein that the reflection directions are designated by the reflection angles $\beta_0$ to $\beta_n$ at the respective base points $P_0$ to $P_n$.

After completion of the designation of the Y-coordinates $y_0$ to $y_n$ and the reflection angles $\beta_0$ to $\beta_n$ (designation of shape parameters) for the respective base points $P_0$ to $P_n$, positions of the respective base points $P_0$ to $P_n$ are determined on the XY plane and the XY curve Q becoming the first base curve on the XY plane is generated based on the positions of the respective base points $P_0$ to $P_n$ thus determined (S104, the first base curve generating step). At this stage, while an XY partial curve $Q_i$ (i=1 to n) is defined as a part of the XY curve between adjacent base points $P_{i-1}$ and $P_i$ (i=1 to n), the determination of the base point $P_i$ and the generation of the XY partial curve $Q_i$ are carried out in order. Each base point $P_i$ and XY partial curve $Q_i$ are generated with reference to the Y-coordinate $y_i$, the reflection angle $\beta_i$, the position of the adjacent base point $P_{i-1}$ or $P_{i+1}$, etc. designated as the shape parameters. A specific method of generating the XY partial curve $Q_i$ will be described hereinafter.

After the XY curve Q has been generated, the subsequent step is carried out to generate XZ curves $R_0$ to $R_n$ becoming a plurality of second base curves extending nearly in the Z-axis direction from the respective base points $P_0$ to $P_n$, for the XY curve Q thus generated (S105, the second base curve generating step). Each XZ curve $R_i$ is generated on the XZ plane or on a plane inclined at a predetermined angle from the XZ plane while being perpendicular to the XY plane, for example, by a curve of predetermined shape (for example, a parabola or a hyperbola) passing the corresponding base point $P_i$.

After the generation of the XY curve Q and the plurality of XZ curves $R_0$ to $R_n$, the surface shape of the reflective surface RS is generated based on those curves Q, and $R_0$ to $R_n$ (S106, the surface shape generating step). The above completes the designing of the reflective surface RS.

In FIG. 1, the surface shape of the reflective surface RS is defined so that an outline thereof is approximately rectangular when viewed from the direction of the optical axis Ax, but an outline of a reflective surface finally produced as a reflector is determined based on the various conditions including the shape constraints and others imposed from the vehicle body side. In this case, after completion of the aforementioned generation of the surface shape, trimming is carried out to remove unnecessary portions so as to match the actual outline shape (designed shape) of the reflective surface RS.

In the reflective surface designing method described above, the single XY curve Q on the XY plane (e.g., the horizontal plane) including the X-axis (the optical axis Ax) and the Y-axis and the plurality of XZ curves R extending nearly in the Z-axis direction (e.g., the vertical direction) from the respective points on the XY curve Q are generated as a frame of the reflective surface RS and a curved surface is spread based thereon, thereby generating the surface shape of the reflective surface RS. The efficiency of the designing work is improved by employing the XY curve (first base curve) and the plurality of XZ curves (second base curves) as a frame in the designing of the reflective surface in this way.

In the above-stated embodiment, the shape parameters such as the Y-coordinate (the position of base point), the reflection angle (reflection direction), and the like according to each XY partial curve $Q_i$ are designated for each of the plurality of base points $P_i$. This enables the designer to give instructions to generate the shape of the reflective surface by designating the shape parameters concerning the position and reflection condition for each base point and XY partial curve, which improves the controllability of the light distribution pattern.

Particularly, the above shape parameters are designated by the reflection directions being the reflection conditions of light at the respective base points P, without designating them by curvatures, focal lengths, or the like. At this time, the reflection directions such as the reflection angles or the like used as the shape parameters are parameters directly corresponding to the resultant light distribution pattern, which facilitates the designing of the reflective surface shape corresponding to the required light distribution pattern.

Here the method of generating the plurality of XZ curves $R_0$ to $R_n$ in the second base curve generating step is preferably a method of generating each XZ curve $R_i$ on the second base plane parallel to the reflection direction designated for each base point $P_i$ and perpendicular to the XY plane being the first base plane (on a plane inclined in the reflection direction from the XZ plane). At this time, the whole of the XZ curve $R_i$ is directed to the designated reflection direction, and reflected light beams from the respective points on the XZ curve $R_i$ are emitted nearly in the same reflection direction. Accordingly, a correspondence is simplified between each XZ curve $R_i$ and each pattern region in the resultant light distribution pattern, which further improves the controllability of the light distribution pattern.

The following will describe the generating method of the XY curve (S104), the generating method of the plurality of XZ curves (S105), and the generating method of the surface shape of the reflective surface RS (S106) in the reflective surface designing method shown in the flowchart of FIG. 3, with reference to specific examples thereof.

Figure 4:
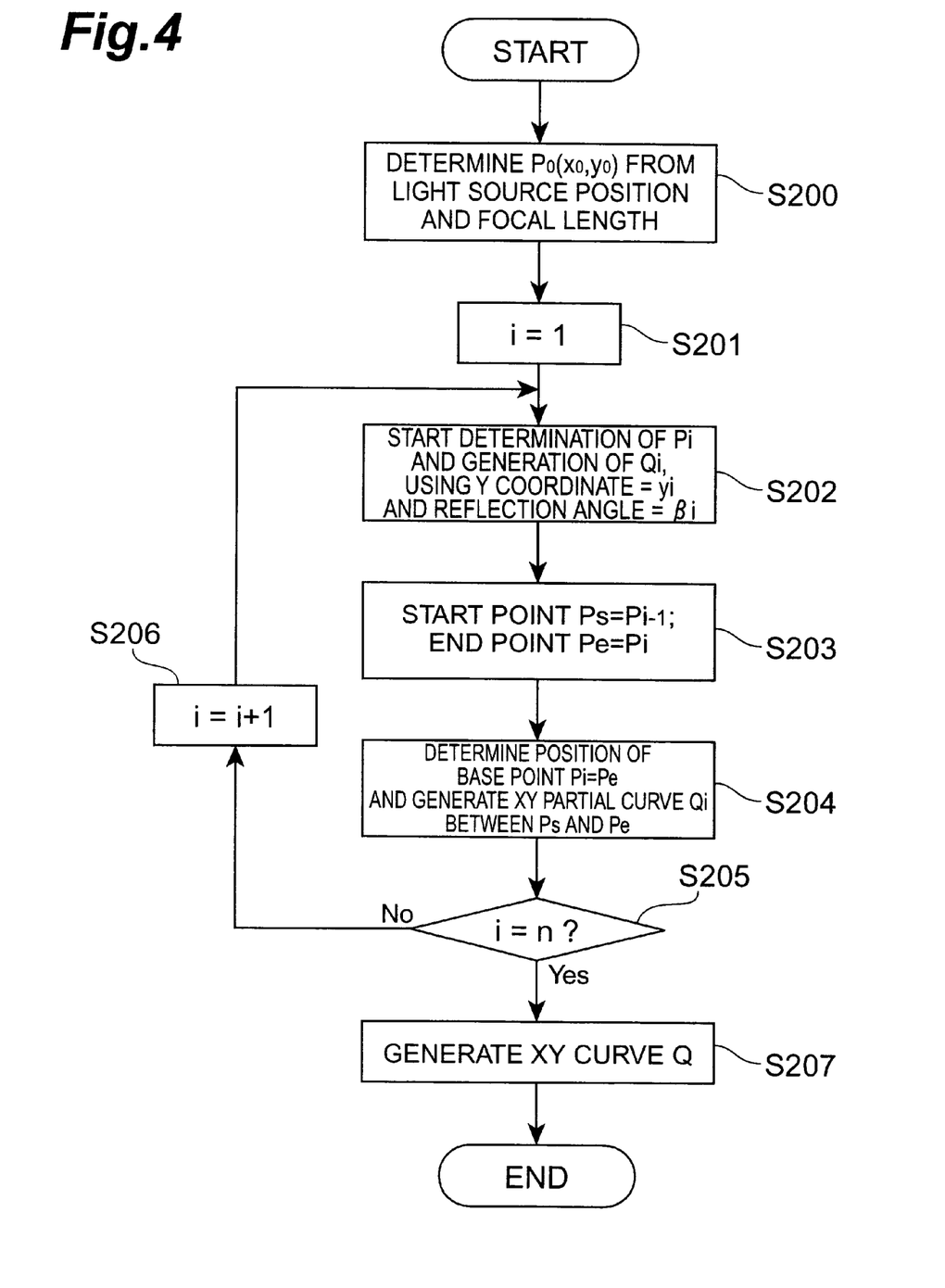
FIG. 4 is a flowchart showing an example of a method of generating an XY curve.
Figure 5:
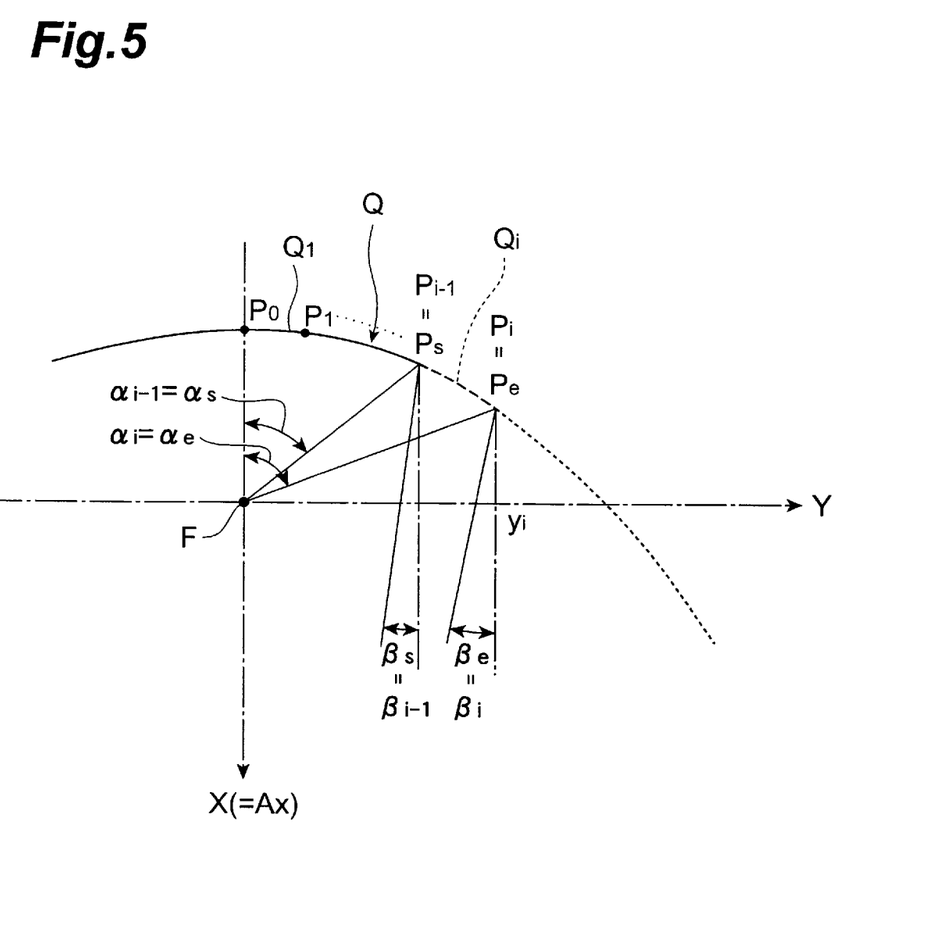
FIG. 5 is a diagram for explaining the generating method of XY curve shown in FIG. 4.

First, the generating method of the XY curve will be described with reference to FIGS. 4 and 5. FIG. 4 is a flowchart showing an example of the generating method of the XY curve. FIG. 5 is a diagram for explaining the generating method of the XY curve shown in FIG. 4.

In the generating method of the XY curve shown in the flowchart of FIG. 4, the XY curve is generated according to the designated number n of divisions (the number of base points: n+1). Namely, the XY curve Q is generated by connecting n XY partial curves $Q_i$ (i=1 to n). The determination of base points $P_i$ and the generation of XY partial curves $Q_i$ are sequentially carried out in an order from the base point $P_0$ on the X-axis on the innermost side (i.e., on the optical axis Ax side) toward the outside.

The first step is to set i=0 and determine the position of the base point $P_0$ $(x_0,y_0)=(x_0,0)$ being a start point of the entire XY curve Q (step S200). This position of the base point $P_0$ on the X-axis is immediately determined from the light source position F (normally, (0,0)) and the focal length $f_0$ designated. The focal length $f_0$ (cf. FIG. 9) set as a parameter is used for only this determination of the position of the base point $P_0$, but it is not used directly for the determination of positions of the other base points.

After the position of the base point $P_0$ is determined, subsequent steps are to set i=1 (S201) and to start the determination of the base point $P_i$ and the generation of the XY partial curve $Q_i$ (i=1 to n) (S202). First, the XY partial curve $Q_1$ is generated corresponding to the base point $P_1$ and then the XY partial curve $Q_2$ is generated so as to be connected thereto. The generation of XY partial curve $Q_i$ is repeated thereafter in this way before i=n. Here the shape parameters designated for the base point $P_i$ and the XY curve $Q_i$ are the Y-coordinate $y_i$ defining the position of the base point $P_i$ in the Y-axis direction, and the reflection angle $\beta_i$ defining the reflection direction of light at the base point $P_i$.

FIG. 5 shows the method of determining the base point $P_i$ at the base point number i, and the method of generating the XY partial curve $Q_i$ there. As shown in this FIG. 5, the base point $P_{i-1}$, the position of which has been determined, is designated as a start point $P_s$ and the base point $P_i$, the position of which is about to be determined, is designated as an end point $P_e$ (S203). Namely, a start point of each XY partial curve $Q_i$ is an end point of the XY partial curve $Q_{i-1}$ generated one before. At this time, coordinates of the position of the start point $P_s$, $(x_s,y_s)=(x_{i-1},y_{i-1})$, both are known, and among coordinates of the position of the end point $P_e$, $(x_e,y_e)=(x_i,y_i)$, $y_e$ is known as designated as a shape parameter and $x_e$ unknown. The incidence angle as $\alpha_s=\alpha_{i-1}$ and the reflection angle $\beta_s=\beta_{i-1}$ at the start point $P_s$ both are known, and among the incidence angle $\alpha_e=\alpha_i$ and the reflection angle $\beta_e=\beta_{i1}$ at the end point $P_e$, $\alpha_e$ is unknown and the reflection angle $\beta_e$ is known as designated as a shape parameter.

In the next place, the XY partial curve $Q_1$ to $Q_{i-1}$, which has already been generated between the base points $P_0$ and $P_s$, is extended toward the end point $P_e$ so as to satisfy the designated shape parameters. Then the position of the base point $P_i=P_e$ is determined, and thus the XY partial curve $Q_i$ is generated between the base points $P_s$ and $P_e$ (S204).

After completion of the determination of the position of the base point $P_i$ and the generation of the XY partial curve $Q_i$, whether i=n is determined (S205) If i<n, there still remains an XY partial curve $Q_i$ which does not have been generated yet. Then a step of setting i=i+1 is carried out (S206), and the above process is repeated to determine the next base point and generate the XY partial curve there. When i=n, all the base points $P_i$ (i=0 to n) have been determined and the XY partial curves $Q_i$ (i=1 to n) have been generated. Therefore, the single XY curve Q is generated from the resultant XY partial curves $Q_i$ (S207), and the process of determining the base points and generating the XY curve is terminated.

Since in the present embodiment one XY curve (first base curve) is formed by generating each XY partial curve $Q_i$ (i=1 to n), based on the shape parameters according to the area thereof, and sequentially connecting such partial curves as described above, the controllability of the light distribution pattern is improved, as compared with the method employing one shape parameter for the entire XY curve. Further, since the XY partial curves $Q_i$ are sequentially generated from one side, the shape and light distribution pattern are smooth. Since an end point of the XY partial curve $Q_{i-1}$ one before, the position of which is known, is used as a start point of the XY partial curve $Q_i$ next generated, the designing of the reflective surface can be carried out efficiently.

Figure 6:
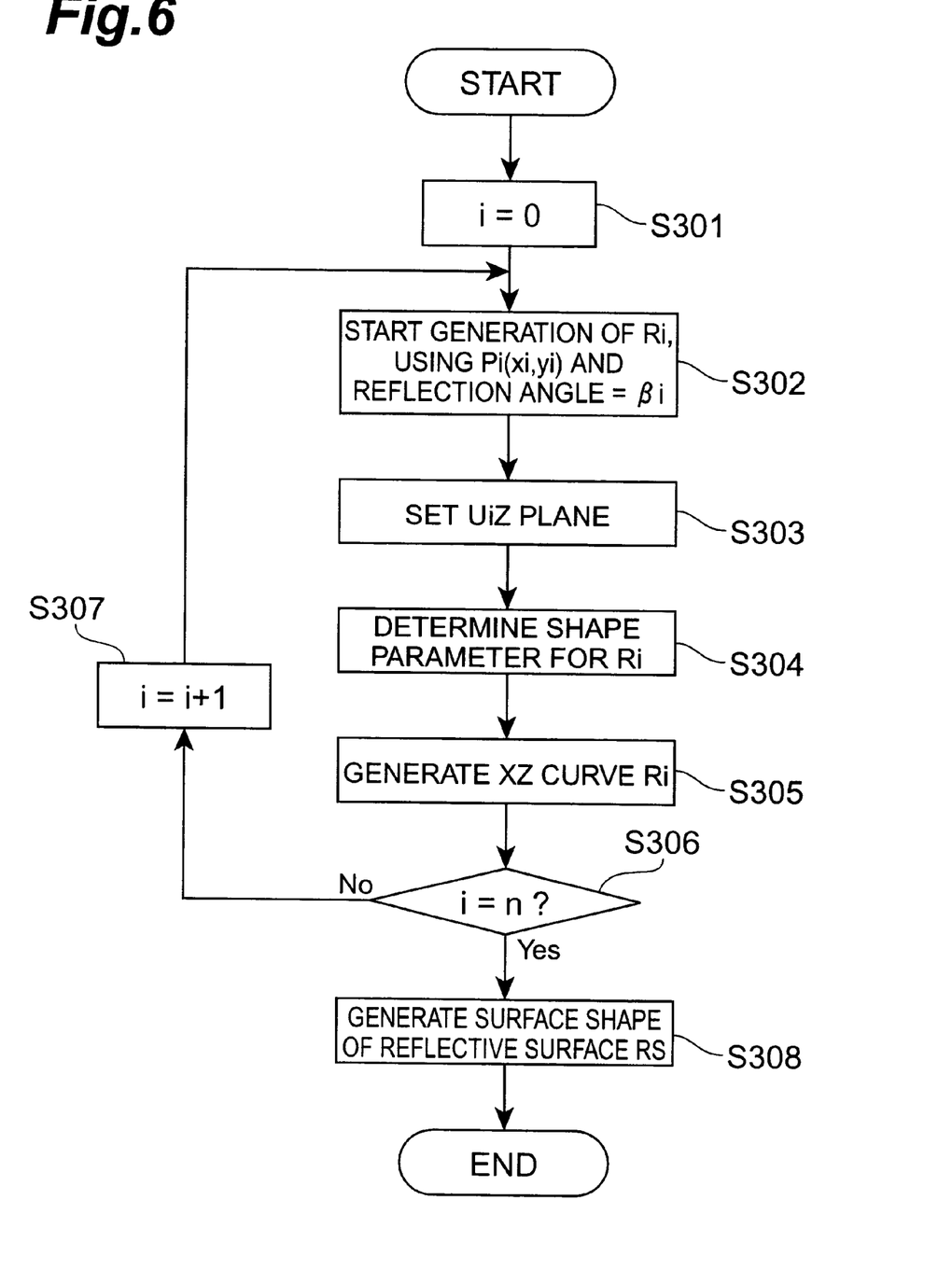
FIG. 6 is a flowchart showing an example of a method of generating XZ curves.
Figure 7:
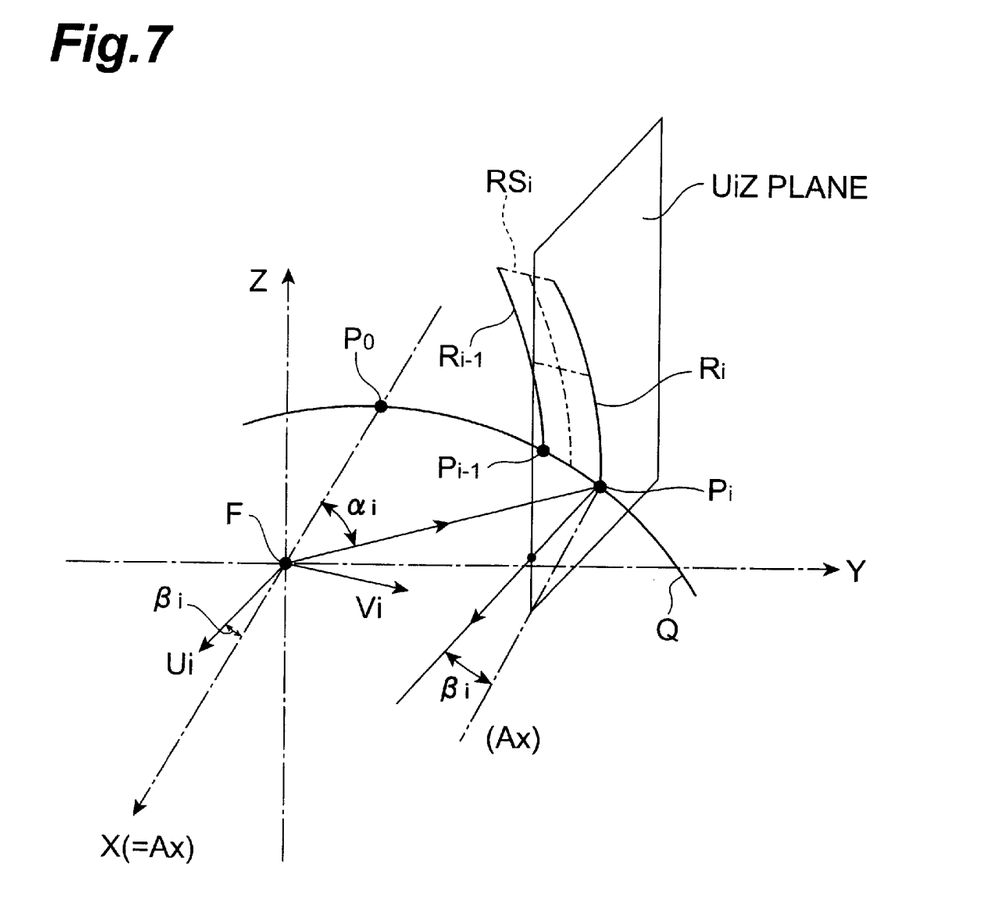
FIG. 7 is a diagram for explaining the generating method of XZ curves shown in FIG. 6.

Subsequently, the generating method of the XZ curves will be described. FIG. 6 is a flowchart showing an example of the generating method of XZ curves. FIG. 7 is a diagram for explaining the generating method of XZ curves shown in FIG. 6.

In the generating method of XZ curves shown in the flowchart of FIG. 6, a UZ plane (the second base plane, which is a plane inclined in the reflection direction from the XZ plane) parallel to the reflection direction designated for each base point $P_i$ and perpendicular to the XY plane (the first base plane) is set, and the XZ curve $R_i$ is generated on the UZ plane. This UZ plane is set at every base point $P_i$. The generation of XZ curve $R_i$ is sequentially carried out in an order from the XZ curve $R_0$ on the XZ plane on the innermost side (i.e., on the optical axis Ax side) toward the outside.

The first step is to set i=0 (step S301) and then the generation of XZ curve $R_i$ (i=0 to n) is started (S302). Here the parameters designated for the XZ curve $R_i$ are the position $(x_i, y_i)$ of the base point $P_i$ already determined, and the reflection angle $\beta_i$ defining the reflection direction of the light at the XZ curve $R_i$ (base point $P_i$). There are also cases including further designated parameters such as a reflection angle at the upper end, a reflection angle at the lower end, a vertical adjustment factor, a longitudinal adjustment factor, and so on (cf. FIG. 9).

First, the $U_iZ$ plane used in the generation of the XZ curve $R_i$ is set (S303) FIG. 7 shows the method of generating the XZ curve $R_i$ at the base point number i. As shown in this FIG. 7, against the coordinate axes consisting of the X-axis, Y-axis, and Z-axis, a $U_i$ axis and a $V_i$ axis are set in place of the X-axis and the Y-axis, respectively. The $U_i$ axis is set as an axis parallel to the reflection direction designated by the reflection angle $\beta_i$ at the base point $P_i$ and perpendicular to the Z-axis. Further, the $V_i$ axis is set as an axis perpendicular to the $U_i$ axis and the Z-axis. From the $U_i$ axis and the Z-axis, the $U_iZ$ plane shown in FIG. 7 is set as a plane including the base point $P_i$.

The next step is to determine a shape parameter necessary for generation of the XZ curve $R_i$ (S304). For example, where the XZ curve $R_i$ is generated by a parabola, the focal length $f_i$ of the parabola is determined as the necessary shape parameter with reference to the positional relation between the light source position F and the base point $P_i$, the reflection direction designated for the base point $P_i$, and so on. If the reflection angles at the upper end and at the lower end of the XZ curve $R_i$, the adjustment factors, etc. are designated in addition to the default values (see FIG. 9), the determination or adjustment of the shape parameter is carried out based thereon. In this case, the curve does not have to be limited to the parabola, but may be either of the other quadratic curves, cubic and higher-order curves, and so on as occasion may demand. Particularly, employment of the cubic and higher-order curves is suitable for fine adjustment of the curve shape.

After completion of the determination of the shape parameter, the XZ curve $R_i$ is generated by a parabola, a cubic or higher-order curve, or the like on the $U_iZ$ plane, based on the shape parameter (S305)

After completion of the generation of the XZ curve $R_i$, whether i=n is determined (S306). If i<n, there still remains an XZ curve not generated yet. Thus a step of setting i=i+1 is carried out (S307) and then the generation of the next XZ curve is carried out. If i=n, all the XZ curves $R_i$ (i=0 to n) have been generated and thus the surface shape of the reflective surface RS is generated from the plurality of resultant XZ curves $R_i$ (S308). Then the process of generating the XZ curves and generating the reflective surface shape is terminated.

For generating the surface shape of the reflective surface RS, the surface shape may be generated on the whole after completion of the generation of all the XZ curves, but it may also be generated in such a way that the reflective surface RS is divided into n reflective surfaces $RS_i$ (i=1 to n) and the surface shape is successively generated every completion of generation of each XZ curve $R_i$, as in the case of the XY curves $Q_i$ as divisions of the XY curve Q. For example, FIG. 7 shows the generation of the surface shape of the reflective surface $RS_i$ between the XZ curve $R_i$ after completion of generation and the XZ curve $R_{i-1}$ already generated.

Figure 8:
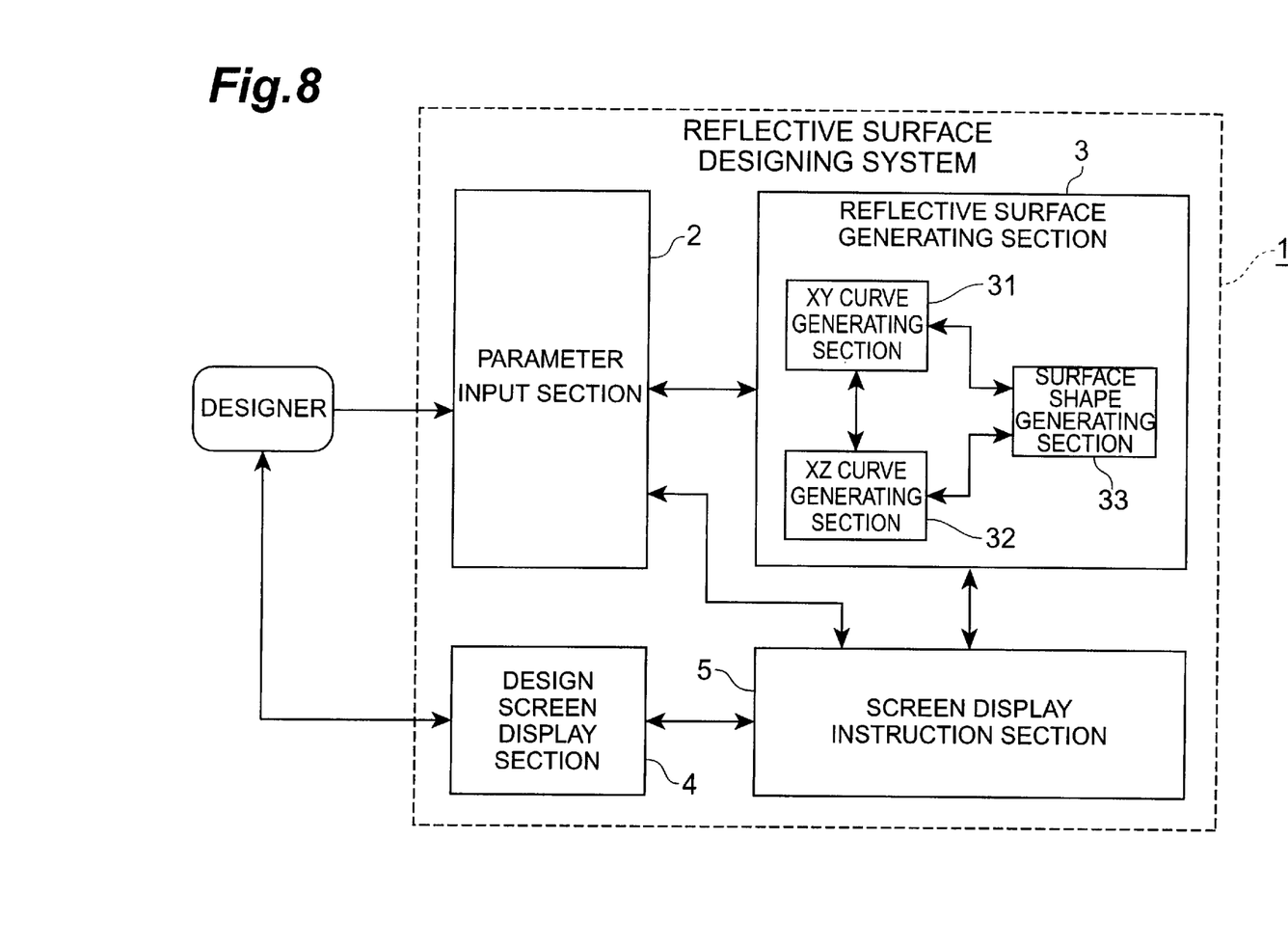
FIG. 8 is a block diagram showing a configuration of an embodiment of a system for designing a reflective surface of a reflector in a vehicle lamp.

The reflective surface designing method can be carried out, for example, by applying a reflective surface designing system of a configuration described below. FIG. 8 is a block diagram showing a configuration of an embodiment of the reflective surface designing system.

The reflective surface designing system 1 shown in FIG. 8 is comprised of a parameter input section 2 for letting a designer input the parameters used in the designing of the reflective surface RS, and a reflective surface generating section 3 for generating the reflective surface RS, based on the input parameters.

The parameter input section 2 enables the designer to input the shape parameters such as the number of base points (or the number of XY partial curves), the Y-coordinates $y_0$ to $y_n$ of the respective base points $P_0$ to $P_n$, and the reflection angles $\beta_0$ to $\beta_n$ at the respective base points $P_0$ to $P_n$. The input operation through the parameter input section 2 implements the designating steps S101 to S103 in the flowchart of FIG. 3. The parameter input section 2 may also be configured similarly to allow the designer to input the fundamental parameters such as the X-coordinate of the light source position F and the focal length $f_0$ at the start point, which are set prior to the designing of the reflective surface RS (cf. S100).

The reflective surface generating section 3 has an XY curve generating section (first base curve generating section) 31 for determining the positions of the respective base points $P_0$ to $P_n$ and generating the XY curve Q; an XZ curve generating section (second base curve generating section) 32 for generating the XZ curves $R_0$ to $R_n$; and a surface shape generating section 33 for generating the surface shape of the reflective surface RS, based on the generated XY curve Q and XZ curves $R_0$ to $R_n$. These generating sections 31 to 33 function to implement the respective generating steps S104 to S106 in the flowchart of FIG. 3.

The reflective surface designing system 1 of the present embodiment is further provided with a design screen display section (display) 4 for displaying a design screen used in the designing of the reflective surface RS, for the designer; and a screen display instruction section 5 for producing a design screen and giving an instruction to display the screen, to the design screen display section 4.

The reflective surface designing system 1 shown in FIG. 8 is substantiated by utilizing hardware; e.g., a CPU for generating the XY curve, the plurality of XZ curves, the reflective surface shape, etc., a ROM for storing programs and others necessary for the processing operation of the system 1, a RAM for temporarily saving data during execution of the programs, an external memory such as a hard disk or the like, an input device such as a mouse, a keyboard, and the like, a display device such as a CRT display, a liquid crystal display, or the like, and so on.

The reflective surface designing system described above is configured by applying the aforementioned reflective surface designing method thereto and lets the designer input each of the parameters of the number of base points, the Y-coordinates, and the reflection angles (reflection directions), thereby designating the parameters.

By employing the configuration to let the designer input each of the parameters upon the designing of the reflective surface in this way, it becomes feasible to designate the optimal parameters in consideration of specific conditions and others in respective lamps, e.g., to designate the positions of the respective base points in the Y-axis direction while properly changing their spacings. It is, however, also possible to automatically designate each of these parameters, for example, by preliminarily determining a method of designating appropriate parameters, e.g., to designate the positions of the respective base points in the Y-axis direction at equal intervals on the Y-axis. Alternatively, instead of letting the designer input the number of base points, the positions of the base points, the reflection directions, etc. through the parameter input section 2, it is also possible to store these information in a database and let the reflective surface generating section 3 read the stored information from the database.

Figure 9:
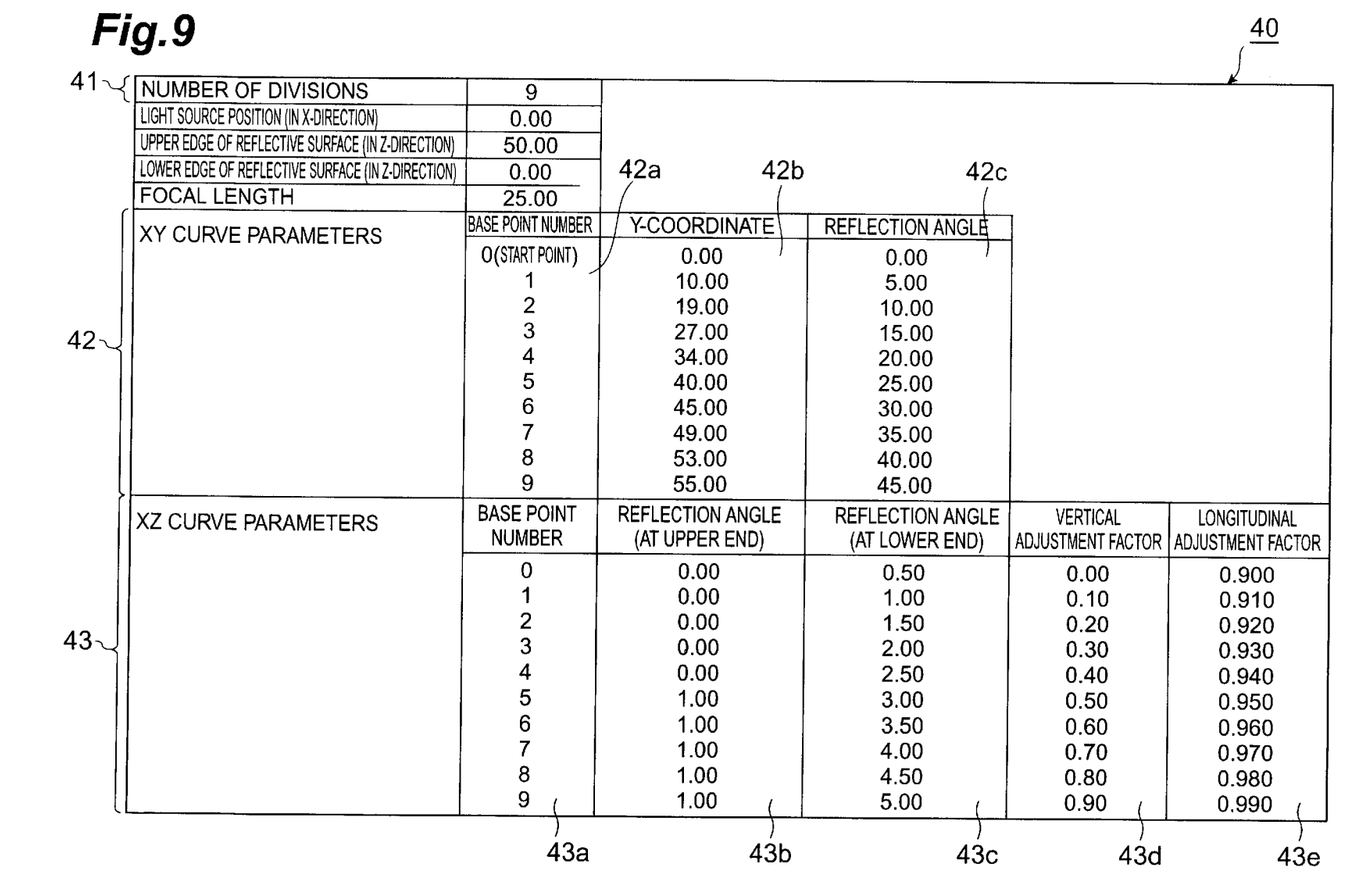
FIG. 9 is a diagram showing an example of a layout of an input screen.

When the system is configured to let the designer input each of the shape parameters as in the case of the reflective surface designing system 1 shown in FIG. 8, the system can be arranged to display an input screen in the design screen display section 4 and let the designer input the shape parameters with reference to it. FIG. 9 shows an example of a layout of such an input screen. This input screen 40 is comprised of a number-of-base-points display area 41 for instructing the designer to input the number of base points or displaying the number of base points inputted, as to the plurality of base points P; an XY curve parameter display area 42 for instructing the designer to input the parameters for the plurality of base points P and the XY curve Q and displaying the parameters inputted; and an XZ curve parameter display area 43 for instructing the designer to input the parameters for the XZ curves R and displaying the parameters inputted.

This input screen 40 is also provided with respective display areas for the light source position (in the X-direction), the upper edge of the reflective surface (in the Z-direction), the lower edge of the reflective surface (in the Z-direction), and the focal length. In the number-of-base-points display area 41, the number of base points (the number of base points=the number of divisions+1) is designated by the number of divisions of the XY curve Q, i.e., the number of XY partial curves $Q_i$ (the number of divisions=9 and the number of base points=10 in FIG. 9).

The XY curve parameter display area 42 is configured to designate the parameters for each of the plurality of base points P used in the generation of the XY curve Q. Specifically, the display area 42 is comprised of an area 42a for displaying the numbers of the respective base points P (0 to 9); an area 42b for instructing the designer to input the Y-coordinates of the respective base points P; and an area 42c for instructing the designer to input the reflection angles at the respective base points P.

Similarly, the XZ curve parameter display area 43 is configured to designate the parameters for each of the plurality of base points P used in the generation of the plurality of XZ curves R. Specifically, the display area 43 is comprised of an area 43a for displaying the numbers of the respective base points P (0 to 9); an area 43b for instructing the designer to input the reflection angles at the upper end of the XZ curves R extending from the respective base points P; an area 43c for instructing the designer to input the reflection angles at the lower end of the XZ curves R extending from the respective base points P; an area 43d for instructing the designer to input the vertical adjustment factors for the XZ curves R extending from the respective base points P; and an area 43e for instructing the designer to input the longitudinal adjustment factors for the XZ curves R extending from the respective base points P.

In FIG. 9, the input screen 40 is illustrated in a state in which examples of the parameter values to be inputted are displayed in the respective input spaces in each area. Before the designer inputs the parameter values, the input screen is presented in a state displaying blanks or default values in the respective input spaces in these display areas.

The method of designing the reflective surface of the reflector in the vehicle lamp according to the present invention is not limited to the above embodiments and examples, but can be modified in various ways. For example, the shape parameters for the respective base points and the XY partial curves are not limited to the above method of designating them by the Y-coordinates and reflection angles of the respective base points, but the shape parameters may be designated by the other parameters. The order of generating the XY partial curves may also be modified to execute the generation from the outside base point toward the inside.

In the method of designing the reflective surface of the reflector in the vehicle lamp according to the present invention, the first base curve and the plurality of second base curves as a frame are used for the designing of the reflective surface, which can enhance the efficiency of the designing work. Since one first base curve is formed by generating the partial curves based on the shape parameters according to their areas and sequentially connecting them, the controllability of the light distribution pattern can be improved, as compared with the method employing one shape parameter for the entire first base curve.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of designing a reflective surface of a reflector used in a vehicle lamp, comprising:

a first base curve generating step of generating a first base curve on a first base plane including an optical axis passing a light source position where a light source is placed and becoming a direction into which light from said light source is reflected by the reflector, and a first base axis perpendicular to said optical axis;

a second base curve generating step of generating a plurality of second base curves extending in a direction of a second base axis perpendicular to said first base plane, for said first base curve; and a surface shape generating step of generating a surface shape of said reflective surface, based on said first base curve and said plurality of second base curves, wherein said first base curve generating step comprises repeating a step of generating one partial curve and thereafter generating a subsequent partial curve so as to be connected to said partial curve, thereby generating one said first base curve consisting of a plurality of said partial curves connected to each other, and wherein each said partial curve is generated based on a shape parameter according thereto.

2. The method according to claim 1, wherein in said first base curve generating step, an end point of said partial curve generated one before, a position of which is known, is defined as a start point and a point said shape parameter of which is designated but a position of which is unknown, is defined as an end point, and wherein each said partial curve is generated by generating a curve so as to satisfy said shape parameter from said start point to said end point.

3. The method according to claim 1, wherein said shape parameter is designated by a coordinate of a point in a direction of said first base axis on said partial curve and a direction into which the light from said light source is reflected at the point.

* * * * *